United States Patent
MacNeille et al.

(10) Patent No.: US 9,524,514 B2
(45) Date of Patent: Dec. 20, 2016

(54) METHOD AND SYSTEM FOR SELECTING DRIVER PREFERENCES

(71) Applicant: FORD GLOBAL TECHNOLOGIES, LLC, Dearborn, MI (US)

(72) Inventors: Perry Robinson MacNeille, Lathrup Village, MI (US); Yimin Liu, Ann Arbor, MI (US); Oleg Yurievitch Gusikhin, West Bloomfield, MI (US); Gary Steven Strumolo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/746,021

(22) Filed: Jun. 22, 2015

(65) Prior Publication Data

US 2015/0287086 A1     Oct. 8, 2015

Related U.S. Application Data

(63) Continuation of application No. 13/767,501, filed on Feb. 14, 2013, now Pat. No. 9,092,309.

(51) Int. Cl.
*G06Q 30/02* (2012.01)
*G06F 17/00* (2006.01)
(Continued)

(52) U.S. Cl.
CPC ........... *G06Q 30/0265* (2013.01); *B60K 35/00* (2013.01); *B60R 16/037* (2013.01); *G01S 19/13* (2013.01);
(Continued)

(58) Field of Classification Search
CPC ....... G06F 17/00; G06F 9/54; H04M 3/42102; G06Q 30/03; G06Q 50/01; G06Q 30/02; B60J 1/12; F02D 41/04; G01C 21/26
(Continued)

(56) References Cited

U.S. PATENT DOCUMENTS 4,899,280 A * 2/1990 Onari ...................... F02D 41/04
                                                                    123/339.23
5,521,580 A    5/1996 Kaneko et al.
(Continued)

FOREIGN PATENT DOCUMENTS

EP          1557810 A2     7/2005
EP          2082190 A2     7/2009

*Primary Examiner* — Yuri Kan
(74) *Attorney, Agent, or Firm* — Jennifer Stec; Brooks Kushman P.C.

(57) ABSTRACT

A vehicle computing system enables one or more processors to control a plurality of vehicle features. The vehicle computing system may control a plurality of vehicle features while determining and selecting occupant preferences for those features. The vehicle computing system may receive input including occupant selections of an application requesting user control. The vehicle computing system may receive context variables at the time of occupant selections. The vehicle computing system may store in memory the occupant selections of the vehicle feature settings and/or controls with the associated context variables. The vehicle computing system may determine an occupant preference to an input request using an associative rule filter based on the occupant selections stored in memory. The vehicle computing system may assign a predetermined amount of time after the application input is requested to allow control of the vehicle feature based on an associative rule filter output.

8 Claims, 5 Drawing Sheets

(51) Int. Cl.

| | | |
|---|---|---|
| *F02D 41/04* | (2006.01) | |
| *G06F 9/54* | (2006.01) | |
| *G01C 21/26* | (2006.01) | |
| *B60R 16/037* | (2006.01) | |
| *B60K 35/00* | (2006.01) | |
| *G01S 19/13* | (2010.01) | |

(52) U.S. Cl.
 CPC ........... *G06F 17/00* (2013.01); *G06Q 30/0255* (2013.01); *B60K 2350/1056* (2013.01); *B60K 2350/1076* (2013.01)

(58) Field of Classification Search
 USPC ....... 705/14.62, 14.73, 14.54, 14.53; 701/22, 701/103, 36, 533; 379/211.02
 See application file for complete search history.

(56) References Cited

U.S. PATENT DOCUMENTS

| | | |
|---|---|---|
| 7,062,778 B1 | 6/2006 | Pattersson |
| 7,219,063 B2 | 5/2007 | Schalk et al. |
| 7,441,192 B2 | 10/2008 | Pisz |
| 7,552,063 B1 | 6/2009 | McEachern |
| 8,050,817 B2 | 11/2011 | Moinzadeh et al. |
| 8,258,939 B2 | 9/2012 | Miller et al. |
| 8,335,709 B2 | 12/2012 | Todd et al. |
| 8,862,299 B2* | 10/2014 | Ricci .................. G06F 9/54 180/167 |
| 2002/0197976 A1 | 12/2002 | Liu et al. |
| 2003/0055554 A1* | 3/2003 | Shioda ................. G01C 21/26 701/533 |
| 2004/0193425 A1 | 9/2004 | Tomes |
| 2005/0060219 A1 | 3/2005 | Deitering et al. |
| 2005/0101304 A1 | 5/2005 | Lin et al. |
| 2007/0113243 A1 | 5/2007 | Brey |
| 2007/0138830 A1* | 6/2007 | Isaac ........................ B60J 1/12 296/146.16 |
| 2007/0163771 A1 | 7/2007 | Straub |
| 2007/0219672 A1 | 9/2007 | Fehr et al. |
| 2007/0226041 A1 | 9/2007 | Oesterling et al. |
| 2008/0051955 A1 | 2/2008 | Ross et al. |
| 2009/0076915 A1 | 3/2009 | Tighe |
| 2009/0094635 A1 | 4/2009 | Aslin et al. |
| 2010/0023393 A1 | 1/2010 | Costy et al. |
| 2010/0057308 A1 | 3/2010 | Hill |
| 2010/0161380 A1 | 6/2010 | Song et al. |
| 2010/0235739 A1 | 9/2010 | Rathi et al. |
| 2010/0256866 A1 | 10/2010 | Toda et al. |
| 2012/0243751 A1 | 9/2012 | Zheng et al. |
| 2012/0249343 A1 | 10/2012 | Thomas |
| 2012/0259541 A1 | 10/2012 | Downey et al. |
| 2012/0265616 A1 | 10/2012 | Cao et al. |
| 2013/0024287 A1 | 1/2013 | MacNeille et al. |
| 2013/0073387 A1* | 3/2013 | Heath .................... G06Q 50/01 705/14.53 |
| 2013/0073389 A1* | 3/2013 | Heath .................... G06Q 50/01 705/14.54 |
| 2013/0073400 A1* | 3/2013 | Heath .................... G06Q 30/02 705/14.73 |
| 2013/0073473 A1 | 3/2013 | Heath |
| 2013/0146659 A1 | 6/2013 | Zhou et al. |
| 2014/0109080 A1 | 4/2014 | Ricci |
| 2014/0119567 A1 | 5/2014 | DeLine et al. |
| 2014/0198906 A1* | 7/2014 | Ricci ................ H04M 3/42102 379/211.02 |

\* cited by examiner

| Transaction | User Ad Selection | | Prior User Ad Selection | | | Sensor Readings | | |
|---|---|---|---|---|---|---|---|---|
| ID | Restaurant | Gas Station | Restaurant | Gas Station | Hotel | Hour | Drive Time | Fuel Level |
| 1 | 0 | 1 | 0 | 1 | 0 | 14 | 4 | 0.3 |
| 2 | 0 | 1 | 1 | 0 | 0 | 15 | 4 | 0.3 |
| 3 | 0 | 1 | 0 | 1 | 0 | 16 | 4 | 0.3 |
| 4 | 1 | 0 | 0 | 0 | 1 | 17 | 5 | 0.1 |
| 5 | 0 | 0 | 1 | 0 | 1 | 18 | 5 | 0.1 |
| 6 | 1 | 0 | 0 | 0 | 0 | 19 | 6 | 1 |
| 7 | 1 | 0 | 1 | 0 | 0 | 8 | 0 | 1 |
| 8 | 1 | 0 | 0 | 1 | 0 | 9 | 1 | 0.8 |
| 9 | 1 | 1 | 1 | 0 | 0 | 10 | 2 | 0.6 |
| 10 | 1 | 0 | 1 | 0 | 0 | 10 | 2 | 0.6 |
| 11 | 1 | 0 | 1 | 0 | 0 | 10 | 2 | 0.6 |
| 12 | 1 | 0 | 0 | 0 | 0 | 11 | 3 | 0.4 |
| 13 | 0 | 1 | 0 | 1 | 0 | 11 | 3 | 0.4 |
| 14 | 1 | 0 | 1 | 0 | 0 | 11 | 3 | 0.4 |
| 15 | 0 | 0 | 0 | 0 | 0 | 14 | 6 | 0.1 |
| 16 | 0 | 0 | 1 | 0 | 0 | 14 | 6 | 0.1 |
| 17 | 1 | 0 | 1 | 0 | 1 | 14 | 6 | 0.1 |
| 18 | 0 | 0 | 1 | 0 | 0 | 14 | 6 | 0.1 |

Fig-6

METHOD AND SYSTEM FOR SELECTING DRIVER PREFERENCES

CROSS-REFERENCE TO RELATED APPLICATIONS

This application is a continuation of U.S. application Ser. No. 13/767,501, filed Feb. 14, 2013, now U.S. Pat. No. 9,092,309, issued on Jul. 28, 2015, which application is hereby incorporated by reference in its entirety.

TECHNICAL FIELD

Embodiments of the invention are directed to methods and system for utilizing contextual feedback to learn, generate and modify vehicle occupant preferences for an in-vehicle computing system.

BACKGROUND

U.S. Pat. No. 8,258,939 generally discloses a device for controlling one or more vehicle features for a primary driver and a secondary driver. The device comprises at least one controller that is configured to receive at least one driver status signal indicative of the driver being one of the primary driver and the secondary driver. The disclosure determines whether the driver of the vehicle is the one of the primary driver and the secondary driver based on the at least one driver status signal. The controller is further configured to control one or more vehicle features and to prevent the one or more vehicle features from being disabled in response to determining that the at least one driver status signal indicates that the driver of the vehicle is the secondary driver.

U.S. Pat. No. 7,441,192 generally discloses systems and methods for providing a user-definable multimedia or digital library. Also disclosed are systems and methods for selecting and playing multimedia or digital files from within the library. The selection and playback systems and methods involve a limited number of user activated buttons, which are implemented both for mapping directly to storage locations of particular multimedia or digital files, and for accepting and playing a multimedia or digital file once selected. The limited number of buttons required for the various features of these systems and methods provide vehicle operators, such as automobile drivers, with a safe mechanism and procedure for retrieving and playing customized play lists and particular songs while driving.

U.S. Patent Application 2010/0235739 generally discloses a media player having advanced-playlist creation capabilities such as the ability to automatically generate a playlist around a "seed" song selected by a user. In some embodiments, the accessory can determine whether the media player can use a particular song as a seed song for an advanced playlist and can so inform the user. The user can then operate the accessory's user interface to create an advanced playlist based on a particular song, rather than having to interact directly with the media player.

SUMMARY

In a first illustrative embodiment, a vehicle computing system enables one or more processors to control a plurality of vehicle features. The vehicle computing system may control a plurality of vehicle features while determining and selecting occupant preferences for those features. The vehicle computing system may receive input including occupant selections of an application requesting user control. The vehicle computing system may receive context variables at the time of occupant selections. The vehicle computing system may store in memory the occupant selections of the vehicle feature settings and/or controls with the associated context variables. The vehicle computing system may determine an occupant preference to an input request using an associative rule filter based on the occupant selections stored in memory. The vehicle computing system may assign a predetermined amount of time after the application input is requested to allow control of the vehicle feature based on an associative rule filter output.

In a second illustrative embodiment, a method of selecting occupant preferences of a vehicle feature by allowing a vehicle computing system to receive associated context variables at the time of an occupant making a selection. The method may allow a vehicle computing system to store in memory the occupant selections with the context variables. The method allows the computing system to determine an occupant preference to an input request using an associative rule filter based on the occupant selections stored in memory. The method allows a predetermined amount of time after the input request before the vehicle computing system controls the vehicle feature based on an associative rule filter output.

In a third illustrative embodiment, a computer-readable medium encoded with a computer program for providing instructions to direct one or more computers to select occupant preferences for one or more vehicle features based on previous occupant selections. The computer readable medium enables the occupant preferences to be stored in memory and used to determine and predict an occupant's input selection to an application (e.g. vehicle feature) requesting input. The computer program receives occupant's input including occupant selections and context variables at the time of occupant selections. The computer program stores in memory the occupant selections with the context variables. The computer program determines an occupant preference to an application requesting input using an associative rule filter based on the occupant selections stored in memory and allows a predetermined amount of time after the input request before controlling the vehicle feature based on an associative rule filter output.

BRIEF DESCRIPTION OF THE DRAWINGS

FIG. 6 shows an example of how associate rules are developed from logged data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
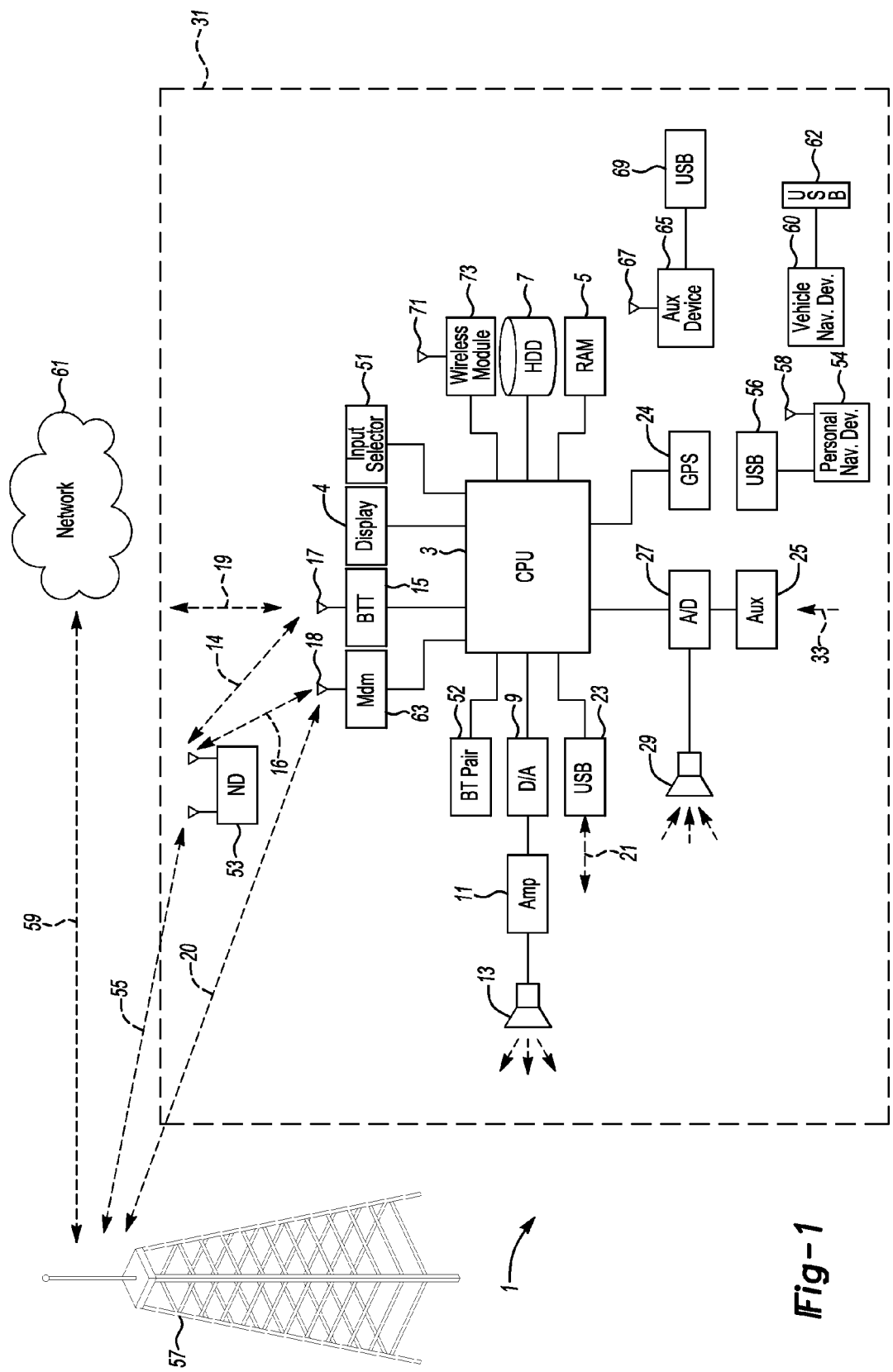
FIG. 1 is an exemplary block topology of a vehicle infotainment system implementing a user-interactive vehicle information display system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
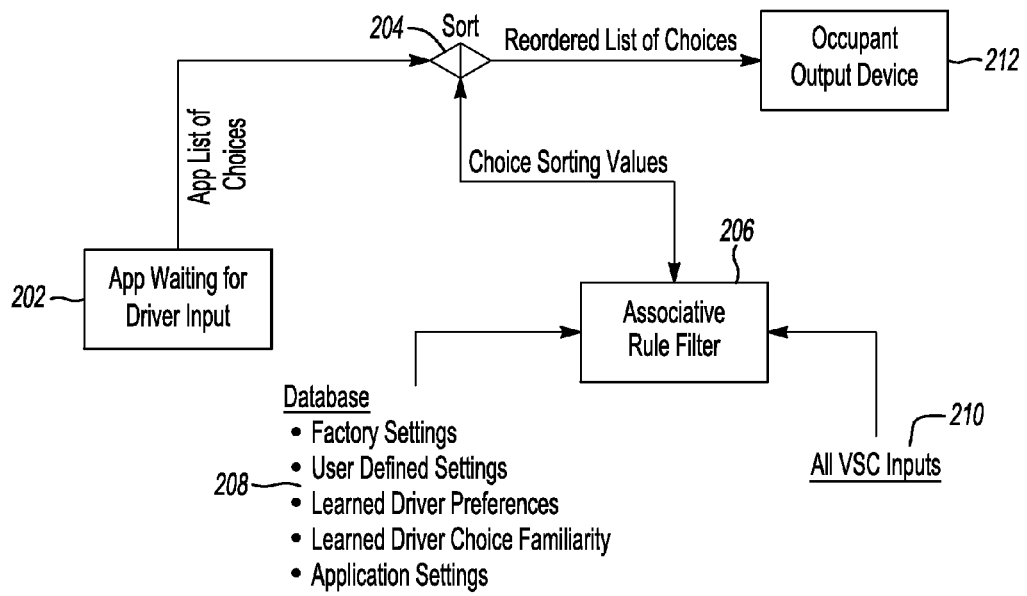
FIG. 2 is a flow diagram illustrating an example process for implementing embodiments of determining and selecting vehicle occupant preferences.

FIG. 2 is a flow diagram illustrating an example process for implementing embodiments of determining and selecting occupant preferences. The VCS automatic selection process 200 may reduce the complexity and the amount of attention needed to manage a large set of menu choices when they are presented in menu form either verbally or visually by the VCS to an occupant. The VCS may present an occupant a selection of settings and/or a list of menu choices including, but not limited to, advertisements, media request, and/or navigation information during a driving experience. An example of a list of menu choices may include, but is not limited to the occurrence when an interactive advertisement requests a vehicle occupant to make a decision. The VCS may have a function that helps vehicle occupants make choices similar to those the occupant would make by himself under similar conditions.

In one embodiment, an occupant may be unfamiliar with a particular menu selection and unable to comprehend all the choices available. The process may train the VCS and simplify the choices based on the occupant's previous selections and preferences limiting the amount of choices displayed. The VCS may also limit the occupant to have the choices repeated over and over again, so the menu system should stop presenting choices as the occupant becomes familiar with them or that vehicle feature.

The occupant may have an input to trigger the VCS to make a satisfactory decision for the occupant based on past preferences avoiding the display of a menu of options or choices. The VCS may determine the amount of time needed to make a decision and limit the selection of choices based on external factors including, but not limited to, factory settings, user defined settings, GPS location data, and/or weather data. If the occupant does not have time to make a decision immediately, a default selection based on previous preferences or selections should be taken. Ideally this may be a smart default choice very similar to the choice the occupant would make under the same conditions.

Where a time limit for making a selection or decision does not exist for a menu of features, the driver may be prompt to respond in a reasonable amount of time. There may be an option to allow the VCS to timeout a request and a default selection may be based on an established good choice analysis for the occupant. The time period to allow the VCS to make a selection for the occupant should vary based on work load estimation and other contextual information.

The VCS automatic selection process 200 may allow the computing system to implement a "Choose For Me" CFM feature within a vehicle. The feature may be represented by the exemplary embodiment process detailed in FIG. 2.

At step 202, the VCS may be running an application or communicating with an application that is requesting an input decision from a vehicle occupant. Communication between the application and the VCS may be through the use of the vehicle CAN Bus, WiFi, Bluetooth, and/or other forms of communication between devices, systems, and/or applications known to one skilled in the art. The application may be a vehicle feature requesting a vehicle occupant to select a setting. The application and/or vehicle feature may include, but is not limited to, an advertising query, incoming phone call response, climate control queries, navigation choices, media choices, and/or multifunction display features.

For example, an occupant may enter a vehicle and perform an ignition cycle to find that the radio may be at the same station location as when the occupant left the vehicle. Or, the occupant may find that the climate control settings may be set at the same temperature from the last car ride the occupant took in the vehicle. Once these vehicle features, application, or systems are initialized, e.g. when the ignition is turned on, they may request an occupant selection of settings. The CFM may receive the occupant selections of vehicle settings and present a list of choices to a vehicle occupant.

The CFM feature may receive and sort the application list of choices for display to an occupant at step 204. The CFM feature may begin sorting the application list of choices by assigning unique coordinate values for each item on the application list of choices and sort this list based on their unique coordinate value in memory. The unique coordinate value may include, but is not limited to, a running calculation of the number of times an occupant has selected that choice under similar conditions and/or a predetermined ranking given by a vehicle occupant. At step 206, the CFM feature may receive the sorted application list of choices and apply an associative rule filter. The associated rule filter may develop several arrays of data analysis before determining the occupant's preferred selection or list of choices.

At step 208, the associated rule filter may receive input from one or more databases that include several data points used for analyzing occupant preference compared to the application list of choices. The variables stored in the database may include, but is not limited to, factory settings, user defined settings, learned user preferences, learned user choice familiarity, and application settings.

At step 210, additional VCS inputs may be used when determining user preference to sort out a list of choices to a vehicle occupant. The additional VCS inputs may include, but is not limited to, GPS coordinates, weather conditions, and time of day. When implementing the CFM feature, the additional VCS inputs may be used in a number of conditions for determining the preferred application list of choices. For example, in the case of a navigation route list of choices, the associative rule filter may receive user defined settings from the database that states that the occupant prefers a scenic route, however based on the VCS inputs the system may notify the associative rule filter that there has been an accident detected on the scenic route. If an accident is detected on the occupant's preferred navigation route, the CFM feature may present a list of choices excluding the accident detected route and/or select an alternative route from the navigation list of choices.

Upon completion of the associative rule filter, the application list of choices may be transmitted back for additional sorting at step 204. Once the sorting is complete, the CFM feature may reorder the list of choices that have been simplified based on predicted and evaluated occupant preferences. For example, once an occupant turns the ignition on a vehicle the radio system may ask the occupant if they would like to listen to three top stations that the occupant usually listens to at that time of day.

The CFM may transmit the list of choices for display on an occupant output device at step 212. From the list, the occupant may choose one of the radio stations, or override the CFM by making a manual radio station selection not on the list. The occupant output device may include, but is not limited to, an instrument panel, center console LCD screen, audio over vehicle speakers, on a smartphone that may be connected to the vehicle through SYNC or other Bluetooth pairing device, or a PC that may be connected to the vehicle through SYNC or other Bluetooth pairing device.

In one embodiment, the reordered list of choices may be available for the occupant to select in a given time period. If the given time period has expired and the vehicle occupant did not respond to the list of choices, the CFM feature may select a choice for the occupant. For example, the list of choices presented to the occupant may include climate control setting when an occupant enters a vehicle. The list of climate control choices may have been generated by the associate rule filter based on several factors including, but not limited to, user defined settings, learned driver preferences, outside environmental conditions, and time of day. The occupant may ignore the list of climate control settings and after a reasonable period of time the CFM may select either a predicted occupant preference or a default setting.

Figure 3:
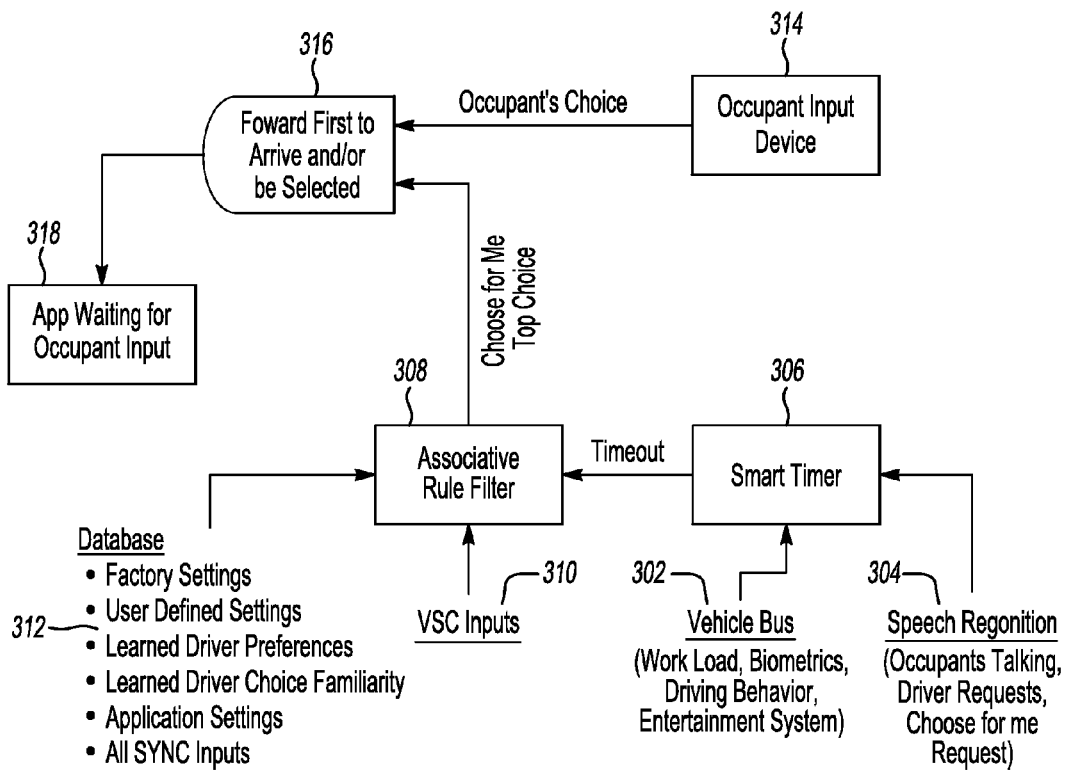
FIG. 3 shows an illustrative example of a vehicle computing system for selecting requested application input using a selection predicting system for a vehicle occupant.

FIG. 3 shows an illustrative example of a vehicle computing system for selecting requested application input using a selection predicting system for a vehicle occupant. The selection predicting system may provide the occupant (user) with one or more choices in cases when a user may be busy. The system may choose one of the options from the list of choices menu. The options from the menu may be presented for a limited time, and if the occupant does not make a choice in time, there is an input selection timeout enabling a default selection to be made. An example is if the VCS and/or SYNC detects an incoming call, a menu of choices may be presented allowing the occupant to make a selection. If the occupant does not make a selection within a predetermined amount of time, the CFM may trigger a default action to be taken. This gives the occupant the option of ignoring the occupant input request allowing them to continue to keep doing what they are currently doing; while enabling the VCS and/or SYNC to take a predicted default action based on occupant setting preferences either learned by the CFM or set by the occupant.

At step 302, the selection prediction system may be initiated by the VCS using several systems and sensors including, but not limited to, detection of occupant workload, biometrics, occupant behavior, and/or occupant interaction with other vehicle features and systems. The selection prediction system may also determine which occupant has entered the vehicle using several technologies including, but not limited to, an occupant's paired wireless device, a user with an associated key, and/or recognition system using a dash mounted camera.

The VCS in conjunction with various sensing capabilities of vehicles are capable of a level of determination of vehicle occupant status previously unseen in modern transportation. Based on detected devices (affiliated with particular users), camera and/or weight sensing devices (which can "recognize" particular users), and a host of other sensors, it is possible to determine, in some instances, precisely which "known" passengers are in a vehicle at a particular time. Even if a given passenger is not known, it may be possible to make some assumptions about the general passenger (such as, for example, the assumption that a 35 lb. passenger is likely a child). In at least one instance, a personalized key present in or used to activate the vehicle can indicate the presence or likely presence of a user associated with the key.

Further, the selection prediction system may be initiated by measuring the cognitive load and/or stress level of a driver or other vehicle occupant. Based on observed weather and traffic conditions, a driving profile, driver body temperature, heart rate, and other biometric measurements, and/or an additional array of observable conditions and driver/vehicle/environmental states, assumptions can be made by vehicle processes of how much cognitive load a driver or other occupant is currently handling.

For example, without limitation, based on the presence of a particular wireless device in a vehicle, and based on readings taken from interior vehicle cameras and seat sensors, a vehicle computing system may recognize that a driver "Jane" and a passenger "Jim" are both in a vehicle. Further, a clock can indicate that it is currently 3:30 AM (meaning, for example, that it is likely dark outside). Weather sensors, a relay indicating that wipers are engaged, and/or cloud-based computing data can indicate that there is currently a hail storm in the vicinity of the vehicle. Cloud-based traffic data can also indicate that the vehicle is currently in moderate traffic. The biometric information may state that Jane may have a high heart rate, while Jim is sleeping. Based on this information, the system can determine a rough approximation of Jane's cognitive load (which, in this instance, may be "high"), and, if appropriate within a load tolerance, what, if any, media input request and/or advertisements may be advisable for delivery to Jane and Jim. Other cognitive load determinations could include, but are not limited to, signal light enablement, wheel speed, steering angle reversal quantity measurements, etc. In this case, before allowing the predicted default action for a requested input, the system begins a smart timer based on analysis of occupant cognitive load at step 306. The smart timer may be a predetermined amount of time allowed for the system to perform analysis before making a prediction.

At step 304, the selection prediction system may also be initiated by a vehicle occupant request. In one embodiment the CFM feature may be requested and presented in a vehicle using several formats including, but not limited to, a button on the steering wheel, on a mobile electronic device, speech recognition request, and or using a hand gesture detector allowing the system to be actuated very quickly and conveniently.

Upon receiving a request to initiate the CFM feature, the system may begin the smart timer at step 306. The smart timer may allow the system a certain amount of time before making a decision. The smart time may be adjusted based on several external factors including, but is not limited to, time of day, occupant, weather and/or current location. For example, if a decision is needed immediately based on the external factors, the system may provide a predicted action for the vehicle occupant. If the decision is in no need for an urgent response based on external factors, the system may provide a reasonable amount of time to present a list of choices for the vehicle occupant before a predicted action and/or default is taken by the selection prediction system.

At step 308, the associative rule filter analyzes and generates a predicted choice or list of choices for the vehicle occupant based on factors from one or more databases that include several data points used for analyzing occupant preference(s) compared to the current requested input. The one or more factors received by the associate rule filter may include, but is not limited to factory settings, user defined settings, stored driver preferences, application settings, and stored driver choice familiarity.

Continuing the example from above of Jane and Jim traveling at 3:30 AM in a hail storm, the associative rule filter analysis may forego delivery of several choices for Jane and/or Jim to choose from, or, alternatively, provides only "safety" related choices. For example, when it comes to advertisement requested input for Jan and Jim, the system may only display ads related to local gas stations and/or hotel options. If there is a media input request for Jane and Jim, the associated rule filter analysis may determine a choice without presenting options to the occupants based on predicted driver preference, and the additional variables including the hail storm and driving at 3:30 AM.

At step 310, additional VCS inputs may be used when determining user preference to sort out a list of choices to a vehicle occupant. The additional VCS inputs may include, but is not limited GPS coordinates, weather conditions, and time of day. When implementing the CFM feature, the additional VCS inputs may be used in a number of conditions for determining the preferred application list of choices. For example, in the case of a navigation route list of choices, the associative rule filter may receive user defined settings from the database that states that the occupant prefers the most fuel efficient route, however based on the VCS inputs the system may notify the associative rule filter that there is traffic detected on the most fuel efficient route, therefore the CFM feature selects an alternative route from the navigation list of choices. In the example of Jane and Jim, the VCS inputs may include, but is not limited to, information related to the 3:30 AM time of day, road conditions during night driving, and/or weather conditions of a hail storm.

At step 312, the associated rule filter may receive input from one or more databases that include several data points used for analyzing occupant preference compared to the application list of choices. The variables stored in the database may include, but is not limited to, factory settings, user defined settings, learned user preferences, learned user choice familiarity, and application settings. The databases may be stored in electronic memory in a vehicle computing system, a cloud, or on a mobile device communicating with the VCS. The database may be able to store usage, selection of, or feedback from previous selection of choices that may also be used to further tailor future content delivery. In the above example, if Jane consistently opts to forego the provided advertisements, the system can eventually determine to withhold all advertisements (unless, for example, a low fuel condition is detected).

At step 314, an occupant input device may allow the occupant to provide input, adjust, and control vehicle features, applications and subsystems. The vehicle features, applications, and subsystems may include, but is not limited to, climate control, navigation, cruise control, entertainment, and/or other applications that may be running off a nomadic device in communication with the VCS. The occupant input device allows a user to preview all selections presented in the list of choices and choose which option he/she would like.

At step 316, the system may allow a vehicle occupant to barge in, so the occupant can indicate a choice before all the selections are presented. The occupant may use their input device to select a choice and override the CFM option or list of choices. The first request to arrive and/or selected may be delivered to the application waiting for occupant input.

To reduce user interaction time, the most likely choices are presented first with a few exceptions. The likelihood of a particular choice is determined by a recommender system that learns the user's preferences based on choices made in the past in specific contexts. In the case of an incoming call, the Caller ID from the cell phone and the time of day from the GPS may be context factors for estimation of likelihood the driver may make a particular choice.

In one embodiment, the recommender system may allow user preferences to be made once the ignition is turned on. For example, the occupant may live in Michigan where in some months the weather may be cold in the morning and mild in the afternoon. If this is the case the occupant may enable the ignition in the morning allowing the system to adjust the climate control to tolerate for the cold weather outside based on the occupant's preference. Once the occupant enters the vehicle in the afternoon, the system may adjust the climate control to tolerate for the mild temperature outside, based on the occupant's preference. The system may allow the occupant to override the recommender system learned preference, associative rule filter choices or default settings.

At 318, after a driver has requested, selected, or has defaulted to the associative rule filter option, the input may be delivered to the application waiting for the occupant input. The application may take the input and perform the appropriate action to the respective vehicle feature, application and/or subsystem control. The application may also be a program and/or feature that are being run off of a mobile device in communication with the VCS.

Another way to reduce vehicle occupant interaction time for choice menus may be accomplished by removing items the occupant is familiar with, particularly if they are rarely chosen. Familiarity with a particular menu item is determined by the number of times it has been presented and selected, and the time it typically takes for the occupant to select the item. Menu items the occupant remembers but are not presented can be actuated by speaking a command associated with that menu item, so removing the item is just a way to avoid presenting information the driver already knows.

Familiarity can also be used for training purposes. When the occupant is unfamiliar with a menu of choices, the CFM may limit the number of choices it presents to the most obvious to simplify the selection. As the occupant becomes more familiar with the obvious choices they are removed and replaced with less obvious choices. In time the CFM only displays unobvious choices and the occupant chooses the obvious choices from memory. Given more time the occupant is familiar with even the unobvious choices and the CFM does not present any of them, allowing for the shortest possible interaction time.

Figure 4:
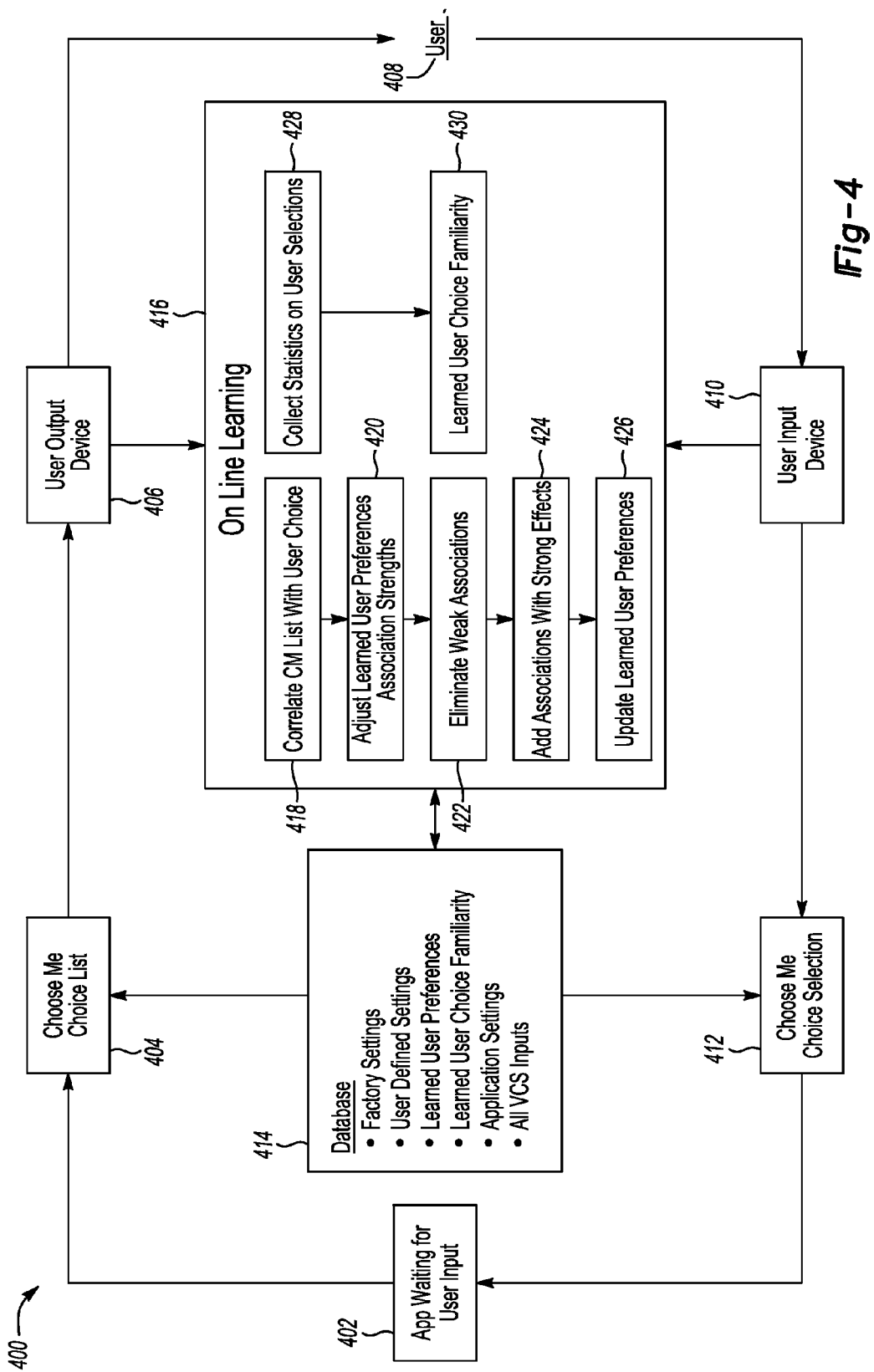
FIG. 4 shows an illustrative example of a vehicle computing system for predicting and determining occupant selections.

FIG. 4 shows an illustrative example of a vehicle computing system for predicting and determining occupant selections. The VCS may have one or more systems in communication to store user settings, occupant setting preference, and learned preferences in a database while continuing to learn and record user decisions associated with several other determining variables. The one or more systems may include vehicle features that comprise applications that may be running off a wireless device, e.g. Pandora communicating with SYNC AppLink. In at least one embodiment, the process doing the actual determining, data retrieval and delivery determination may be an off-board process, with only data gathering and provision to that process occurring on-board. The decision making process 400 may have a number of possible inputs. In this example, the inputs are stored in a database 414 that may be located in electronic memory within the VCS.

An application may present a request for a user to make a selection, and may continue to wait for the user's input 402 based on that request. The application request may include, but is not limited to, a climate control feature, navigation input, media input request, advertisement display, and/or an incoming telephone call. The application may begin to make a request for user input based on an initialization signal sent to the application. The initialized signal may be generated by several processes including, but not limited to, the VCS detecting an occupant in a vehicle, turning the ignition on in a vehicle, and/or using a unique key that may recognize an occupant when entering a vehicle. The VCS may detect an occupant in a vehicle using several technologies including, but not limited to, Bluetooth recognition of an occupant's previously synchronized wireless device.

The application request may be received and processed by the VCS. The VCS may transmit the application request to a predicting system to begin a prediction of user preferences. The predicting system may receive the application request for input, and begin to generate a user customer CFM choice list 404 based on several variables related to the user that is stored in one or more databases 414. The database 414 may be communicating with the VCS either through cloud computing or through a wireless device communicating with the VCS using Bluetooth technology. The wireless device may include, but is not limited to, a smart phone, laptop computer, and/or a personal computer tablet.

The database 414 may include, but is not limited to, factory settings, user defined settings, predicting system's learned user preferences, learned user choice familiarity, application settings, and other VCS inputs. For example, an initialized vehicle feature waiting for user input may be a request to select a media choice to allow the entertainment system to play music. The application may wait for a user input and send the request to the predicting system for generating a CFM choice list 404 of predicted songs/albums for the user. The predicting system may look at the user defined play lists, and based on those play list look at the learned user choice familiarity based on a number of factors including, but not limited to, the day of the week, month of year, and/or time of day to generate a list of options for display to the user. In one embodiment, the predicting system may notice that it is a Friday at 5:00 PM and based on learned user preferences may present upbeat songs out of the user's media catalog. In another embodiment, the predicting system may notice that it is Monday at 7:30 AM, and based on setting preference select a weather and traffic station to prepare the user for the morning commute to work.

After the predicting system generates a predicted list of choices based on the user, the list may be transmitted and presented to a user output device 406. The user output device 406 may include, but is not limited to, an instrument panel, center console LCD screen, audio over vehicle speakers, on a smartphone that may be connected to the vehicle through SYNC or other Bluetooth pairing device, or a PC that may be connected to the vehicle through SYNC or other Bluetooth pairing device. The occupant selection of settings for the vehicle feature and/or the generated choice list 404 may be stored and used for further analysis in the predicting system continuous learning process 416 for future application(s) user input request.

The method of continuous learning process for the predicting system communicating with the VCS may be implemented through a computer algorithm, machine executable code, or software instructions programmed into a suitable programmable logic device(s) of the vehicle, such as the VCS, the entertainment module, other controller in the vehicle, or a combination thereof. Although the various steps shown in the on line learning flowchart diagram 416 appear to occur in a chronological sequence, at least some of the steps may occur in a different order, and some steps may be performed concurrently or not at all.

At step 418, after a list of choices are generated and presented to the user at their output device, the learning algorithm may also receive that list to correlate it with a user choice under the present occupant, vehicle, and/or environmental conditions. The learning algorithm may determine the value of a choice or list of choices to one or more variables and/or factors. The selection predicting system may be updated, and may have choice(s) associated with variable and/or factor values based on, for example, observed behavior, preferences of occupant(s), vehicle context, environmental conditions, vehicle state, times of day, etc.

At step 420, the learning algorithm may adjust user preferences association strengths based on the generated list and user selection of the input. The learning process may eliminate weak associations based on the adjusted learned user references at step 422. For example, without limitation, if a climate control request is requested the system may evaluate the vehicle environment. This evaluation may include, but is not limited to, weather sensing or information retrieval, engagement of four wheel drive or traction control, engagement of headlights, wipers, and/or time of day. The learning process may learn an occupant's preference to have the climate set under circumstances evaluated while eliminating weak selections that the user never selects.

For example, the system may set a climate control request for an occupant to 72 degrees Fahrenheit at a particular time of day, and month of the year. The system may present several input choices, however learn that the occupant prefers a range form 70-75 degrees Fahrenheit, with heated seats enabled, and rear defrost turned on based on user preferences. The system may eliminate weak climate control settings under those conditions, e.g. temperatures choices below 70 degrees Fahrenheit, and no request for air conditioning.

At step 424, the learning process may add association for a particular user preference with strong effects. To continue from the climate control user input request above, adding associations with strong effects may include, but is not limited to, storing outside environmental conditionals and time of day to climate control user preference settings for a particular occupant. Once the algorithm has completed its analysis, it may update the learned user preferences at step 426. The learned user preference may be stored in a database 414 residing on-board with the VCS or off-board in a cloud or mobile wireless device.

Once a choice list is presented to a user using an output device 406, the user 408 may review the list of choices and either selecting an option from the list or override the list by making a selection that is not included on the list. The user 408 may make a selection using a user input device 410. A user input device may include, but is not limited to, an application running on a mobile device, a vehicle feature with controls available on a center console of the vehicle, and/or user button(s) positioned on a steering wheel.

After a user has made a selection for the application waiting for a user input request, the selection may be record in the learning process algorithm 416. The learning process algorithm may also collect statics on user selections at step 428. The collected statics may be used to learn user choice and familiarity with a certain application request input at step 430. The learned user choice familiarity based on collected statics may be transmitted and stored on a database 414. The learned user choice familiarity may be used for future analysis and creation of the prediction system choice list for that particular application input request.

The user may make a selection presented from the choice list 404 generated by the prediction system, or may override the prediction system list of choices by making a selection not offered on the list using the user input device 410. The user may also allow the prediction system to make a choice selection 412 based on analysis from the database and the continuous learning algorithm. The choose for me choice selection 412 feature may be either requested by the user using the user input device 410, or may be selected based on a timer default of the prediction system if a choice isn't made within a reasonable amount of time.

Figure 5:
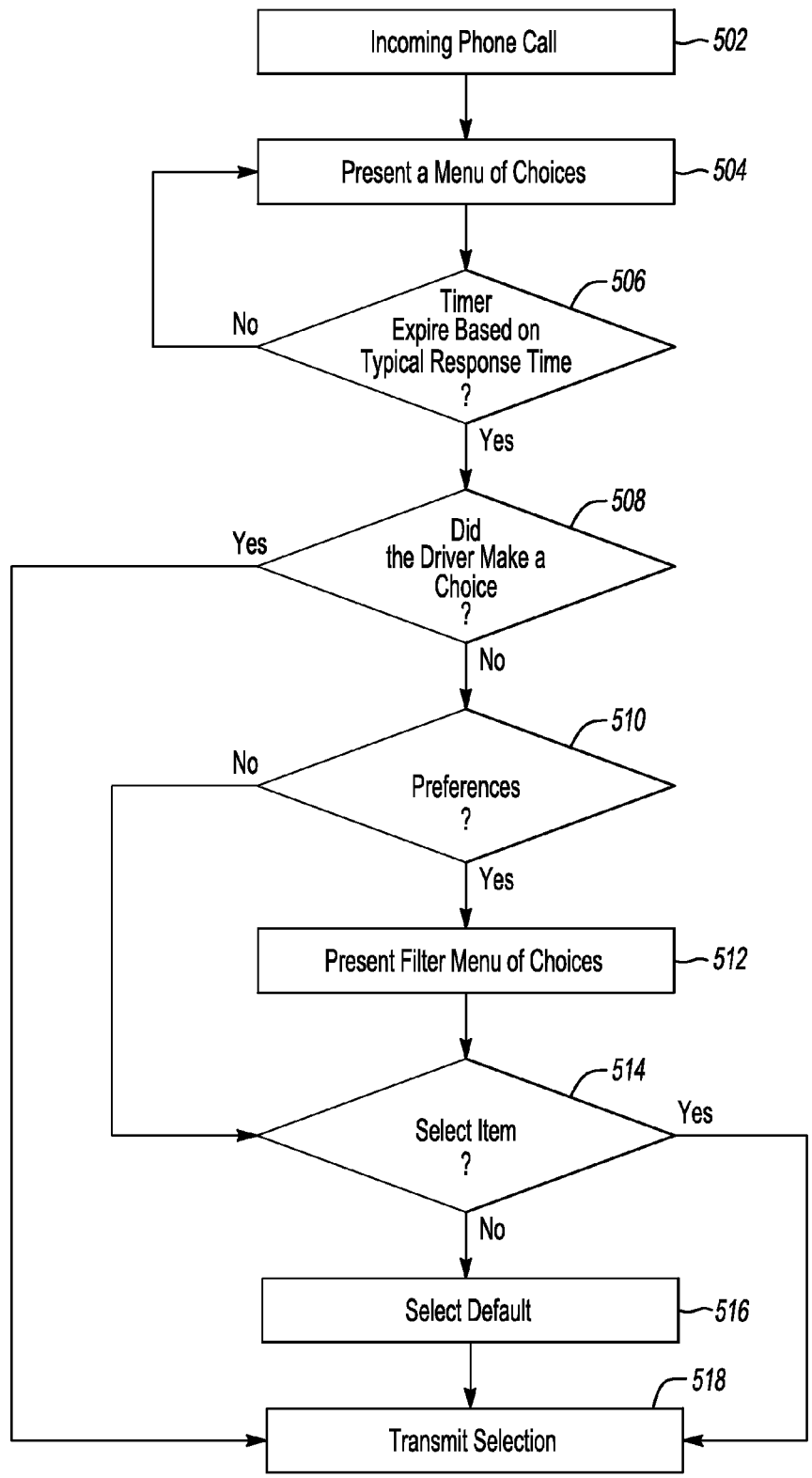
FIG. 5 is a flow chart illustrative of a vehicle computing system for determining an incoming phone call selection predicting process.

FIG. 5 is a flow chart illustrative of a vehicle computing system for determining an incoming phone call selection predicting process. In this example, some or all of the relevant contextual information is examined by the prediction system process. The relevant contextual information may look at variables and factors related to vehicle behavior, environmental factors, cognitive load and/or stress level of an occupant.

The VCS may initialize several vehicle features and applications based on the detection of an occupant. An initialized application may request input based a particular occupant. In one embodiment, the VCS may recognize a particular user based on the pervious pairing of the occupants smart phone device. Based on the recognized occupant, the VCS may retrieve occupant setting preferences including incoming telephone call management. The incoming telephone call management may include preferences on limiting the amount of received phone calls, text messages or emails while the occupant is in the vehicle. The VCS may use the associate rule filter to determine which phones calls, text messages or emails to limit based on several factors including, but not limited to, weather conditions, and/or cognitive load.

At step 502, the VCS may detect an incoming phone. In one example, the incoming phone call may be a text message or an email message being received by a user's wireless device in communication with the VCS. The incoming phone call may be received by an occupant's wireless device and transmitted to the VCS using Bluetooth technology.

The VCS may determine and generate a list of choices for presentation to a vehicle occupant, giving the occupant a list of options on how to manage the incoming phone call. The list of choices may be generated by a user predicting system. The user predicting system may include user preference software that predicts and learns occupant behavior to generate a list of choices for a specific application input request.

Once the VCS determines and generates a list of choices based on occupant settings, factory settings, and/or occupant learned behavior, the system may present a menu of choices to an occupant at step 504. The VCS may present the menu of choices by transmitting to occupant using in-vehicle displays and/or on the occupant's wireless device. The menu of choices generated for an incoming phone call may include, but is not limited to, answering the phone call, sending the phone call to voice mail, or sending a default text message back to the incoming phone call telephone number letting the person know that the occupant is busy and will call back shortly. In one example, the system may not present a menu of choices if the VCS detects that the incoming phone number is a telemarketer number, and/or the system has detected the cognitive load related to the occupant is high.

In one embodiment, the occupant may receive an email message from their employer. The email message may have a high priority associated with it. The system may notice that the email is from the occupant's employer and that it is high priority. Based on the factors stored in the database, and/or other VCS input, the system may generate a response message to the employer email letting them know that the occupant is currently driving and the email message is received by the occupant.

At step 506, the VCS may have a timer that provides the user predicting system a reasonable amount of time to present a menu of choices to the occupant before a default action is taken. If the timer has not expired, the menu of choices may continue to present itself to the occupant on an output device. The output device may include an on-board vehicle display unit, and/or an occupant's mobile device.

If the timer expires, the VCS may determine if the driver had selected an option from the menu of choices presented at step 508. If the driver has made a selection, the VCS may transmit the selection to the respective application requesting user input. The application requesting user input in this example may be a smart phone device connected to the VCS, and/or an embedded cellular phone within the VCS.

At step 510, if the timer has expired, and the driver did not make a choice, the user predicting system may transmit a user preferences response to the incoming phone call request. The user preference may have a standard response for a particular phone number, for example if it is the occupants home phone number calling his smart phone the preference may be to answer the call. If there are one or more user preferences for a particular phone number, the predicting system may filter out the choices based on several variables and factors including, environment conditions, time of day, traffic, and learned occupant preferences at step 512. If there is no preference for answering the incoming call, the VCS may see if the occupant has selected an item from the list of choices at step 514.

At step 518, if the occupant has selected an item from the list of filter menu choices, the selected item may be transmitted to the application requesting user input. If no item has been chosen by the occupant, the system may select a default selection based on the incoming phone number received at step 516. Once the default selection has been made by the system, the selection may be transmitted to the smart phone device at step 518. An example of a default selection may be to send the incoming phone call to voicemail if the cognitive load for the occupant is high.

FIG. 6 shows an example of how associate rules are developed from logged data. The associate rules may be applied when the learning system begins to generate a list of options and/or control a vehicle feature selection based on an occupant preference. The associative rule filter may be intended to identify strong rules discovered in one or more databases using different measures of interest to the occupant. The logged data 600 shown in the example are for three types of advertisements including, but not limited to, restaurants, gas stations, and, hotels. There may be one or more algorithms used for generating the rules and assigning association, statistics and other occupant preference ranking to strengthen the predicted occupant preference selection for the learning system.

One or more categories of advertisements presented to a vehicle occupant may be categorized on a data log. The associative rule filter may discover regularities between previous occupant selections, occupant settings, and context variables. For example, if an occupant is driving on a Friday at 6:00 PM, and is headed towards an area of multiple restaurants, the associative rule filter may indicate that such activity by the occupant usually results in the purchase of a carryout pizza. Such information can be used as the basis for decisions about sending an advertisement such as a promotional price or product placement for a pizzeria.

The data log may continue to receive occupant input based on a request from an application in communication with the VCS. The associative rule filter may delete topics, and/or categories not used or selected from a data log. The associate rule filter deletes these categories if the occupant continues to ignore, or never select that option related to the category. The associate rule filter may add a category to the data log based on occupant settings, preferences, and/or with the use of an exploration model. The exploration model may predict an occupant input to a vehicle feature and/or application based on previous occupant selections.

In one embodiment, the logged data 600 may have three topics including restaurant, gas station, and hotel advertisements for display to a vehicle occupant. The logged data may have several topics; however for this example three topics are used. The logged data may be split up in several columns including, but not limited to, a transaction 602, user ad selection 604, prior user ad selection 606, and sensor readings 608. The transaction 602 column may provide a unique transaction ID that tracks the subset of items and variables that may include, but is not limited to, an occupant selections, occupant settings, and/or context variables. The transaction 602 may prioritize the list of occupant preferences for presentation to the occupant.

The user ad selection 604 may generate an occupant preference from the associative rule filter for presenting advertisements to the occupant. The user ad selection 604 may be based off of prior user ad selection 606 and sensor readings 608. For example, in Table 1 the association rules for the advertisement may be the following statistical strength used to prioritize the transaction ID 604.

TABLE 1

| Advertisement | Sensor Reading |
| --- | --- |
| Restaurant | Hour = 17, 8, 9, 10 |
| Gas Station | Fuel Level = 0.3, 0.4 |
| Hotel | Hour = 18, 19, 14 |
| | Drive Time = 6 |

Based on our example, the association rules may select a gas station advertisement for presentation to a vehicle occupant based on the sensor readings 608 of fuel level 616. The association rules state that if the fuel level 616 sensor reads 0.3 or 0.4 generate a gas station advertisement for display to a vehicle occupant. The associative rule filter may also use the prior user ad selection 606 to determine whether to generate a gas station ad to the occupant. In the logged data 600 shown, the associate rule filter may generate the user ad selection for a gas station 612 based on the fuel level sensor and the prior user ad selection 606. In this example, the transaction ID for the gas station advertisement may be assigned top priority 610.

Once the advertisements have been weighted, according to, for example, known occupant preferences, sensor readings, and association rules, the learning system may rank the advertisements for delivery to vehicle occupant. A bundle of advertisements with related association rules may be sent to a vehicle occupant and/or be queued based on ranking of the learning system. The learning system may generate logged data for occupant setting for vehicle features, applications, and other VCS subsystems/applications that may request occupant input.

The learning system may use several algorithms and/or predicting software besides the associative rule filter. Other algorithms and/or predicting software for use in the learning system may include, but is not limited to a decision tree learning.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising: a processor configured to,
   identify present vehicle-related context variables and corresponding values;
   in response to the context variables, generate a ranked list of possible advertisements using an associative rule filter that weights advertisements based on predefined category associations with identified context variables and corresponding context variable values; and
   in response output an advertisement to a device according to an advertisement order defined by the ranked list.

2. The vehicle system of claim 1, wherein the context variables include one or more of GPS coordinates, time of day, day of week, and month.

3. A computer-program product embodied in a non-transitory computer readable medium for a vehicle processor comprising instructions for:

in response to a request received to output an advertisement, outputting the advertisement to a vehicle display according to an order of a plurality of advertisements on a ranked list generated by an associative rule filter that identifies present vehicle-related context variables and corresponding values and ranks the list by weighting advertisements based on predefined category associations with identified context variables and corresponding context variable values.

4. The computer-program product of claim 3, the non-transitory computer readable medium further comprising instructions for:

establishing communication with a wireless device executing an application requesting the advertisement.

5. The computer-program product of claim 3, wherein the plurality of advertisements on the ranked list includes one or more advertisements available to the occupant based on a vehicle GPS location.

6. The computer-program product of claim 3, wherein the context variables include one or more of a GPS location, environmental conditions, and occupant cognitive load as determined by the vehicle processor.

7. An advertising method comprising:

identifying, via a vehicle processor, present vehicle-related context variables and corresponding values;

in response to the context variables, generate a ranked list of possible advertisements using an associative rule filter that weights advertisements based on predefined category associations with identified context variables and corresponding context variable values; and in response to a request for an advertisement received from an application, outputting an advertisement based on an advertisement order defined by the ranked list.

8. The advertising method of claim 7, wherein the context variables include one or more of GPS coordinates, time of day, day of week, and month.

* * * * *